United States Patent [19]
Magnuson

[11] Patent Number: 4,715,730
[45] Date of Patent: Dec. 29, 1987

[54] LINEAR MOTION PILLOW BLOCKS INCLUDING SELF-ALIGNING FEATURES

[75] Inventor: Robert E. Magnuson, Greenbrook, N.J.

[73] Assignee: Lee Controls, Inc., Piscataway, N.J.

[21] Appl. No.: 844,366

[22] Filed: Mar. 26, 1986

[51] Int. Cl.[4] .................. F16C 29/04; F16C 29/12
[52] U.S. Cl. ............................. 384/52; 384/57; 384/58
[58] Field of Search ............... 384/7, 10, 29, 38–41, 384/46, 49–53, 57–59

[56] References Cited

U.S. PATENT DOCUMENTS

| | | | |
|---|---|---|---|
| 1,811,508 | 6/1931 | Klages | 384/53 |
| 1,872,718 | 8/1932 | Flanigan | 384/52 |
| 2,316,727 | 4/1943 | Thompson | 384/46 |
| 2,622,939 | 12/1952 | Ljunggren | 384/57 |
| 2,659,634 | 11/1953 | Maximoff | 384/58 X |
| 2,736,616 | 2/1956 | Brame | 384/59 |
| 3,504,952 | 4/1970 | Farmer | 384/58 X |
| 3,749,455 | 7/1973 | Meier | 384/53 |
| 3,887,247 | 6/1975 | Graae | 384/53 |
| 4,005,913 | 2/1977 | Thomson, Jr. | 384/43 |
| 4,254,112 | 4/1981 | Magnuson | 384/29 |
| 4,347,916 | 9/1982 | Schröder | 384/58 X |
| 4,375,195 | 3/1983 | Tsuboi | 384/58 X |

FOREIGN PATENT DOCUMENTS

| | | | |
|---|---|---|---|
| 3013410 | 10/1981 | Fed. Rep. of Germany | 384/53 |
| 3040711 | 6/1982 | Fed. Rep. of Germany | 384/40 |
| 3132869 | 3/1983 | Fed. Rep. of Germany | 384/57 |
| 59021 | 5/1981 | Japan | 384/40 |

OTHER PUBLICATIONS

Linear Bearing Stiffness Triped by Tight Design, by Frank Yeaple, Fluid Power Editor, 96/Design News, 12/17/84.
Thomson Industries, Inc., Manhasset, New York, N.Y. 11030, 1983 Catalogue Pages (3).
Thomson Industries, Inc., Manhasset, N.Y. 11030, undated ad (2 pages, front and back).
McGill Precision Bearings, Catalogue, H-80A, Sep. 1984 (6 pages).

Primary Examiner—Stuart S. Levy
Assistant Examiner—Thomas R. Hannon
Attorney, Agent, or Firm—Martha G. Pugh

[57] ABSTRACT

This patent relates to roller bearing self-aligning pillow blocks, which are constructed to include one or more sealed roller bearings disposed in tangential relation to the primary shaft at one or more positions around its periphery. Each roller bearing is mounted to rotate about its own stud, so that it acts as a cam follower. In some embodiments the roller bearings are disposed singly, or in pairs, in three positions spaced-apart 120 degrees around the periphery of the shaft. In other embodiments the bearings disposed to the right or the left of the center are in diametrically-opposite positions. Alternatively, in another embodiment, the rollers are disposed only in contact with the upper surface of the shaft at positions spaced-apart, say, 45 degrees. A particular feature of the invention is a device for fine tuning the tangential contact between a roller and the surface of the principal shaft by utilizing a screw to rotate an eccentrically-tapped stud supporting the roller, or an eccentrically-disposed rotatable plate supporting a pair of rollers.

15 Claims, 34 Drawing Figures

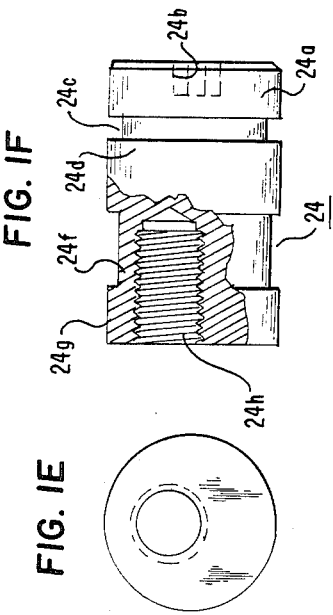
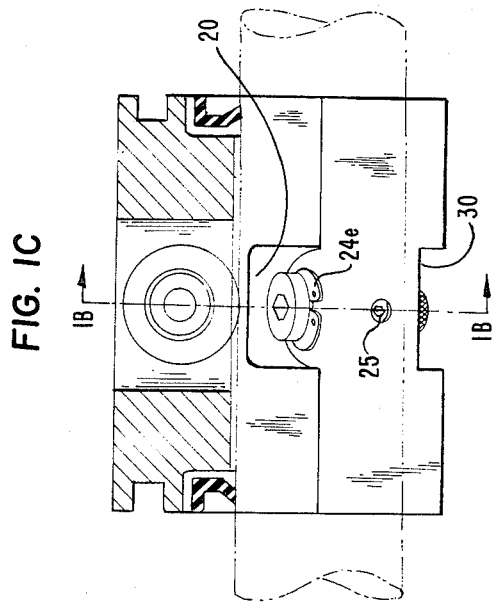
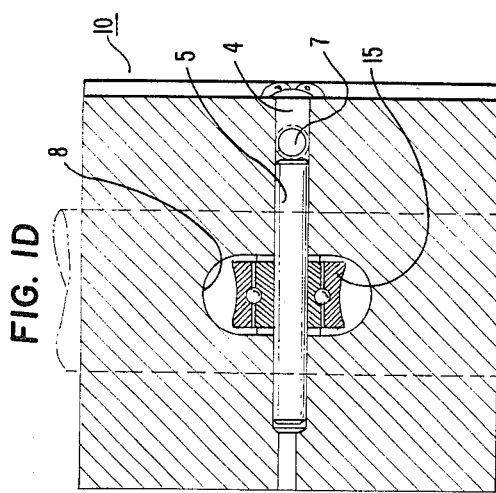
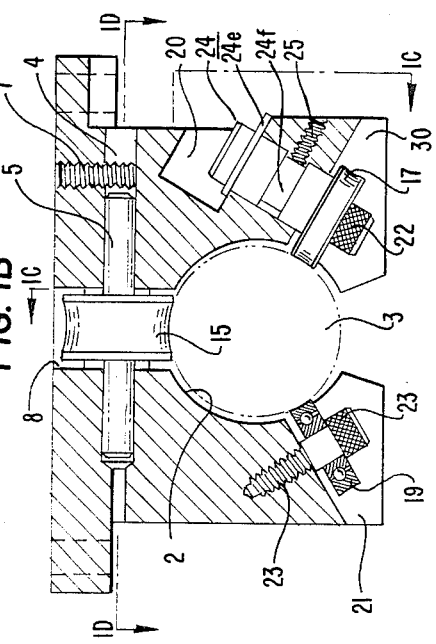

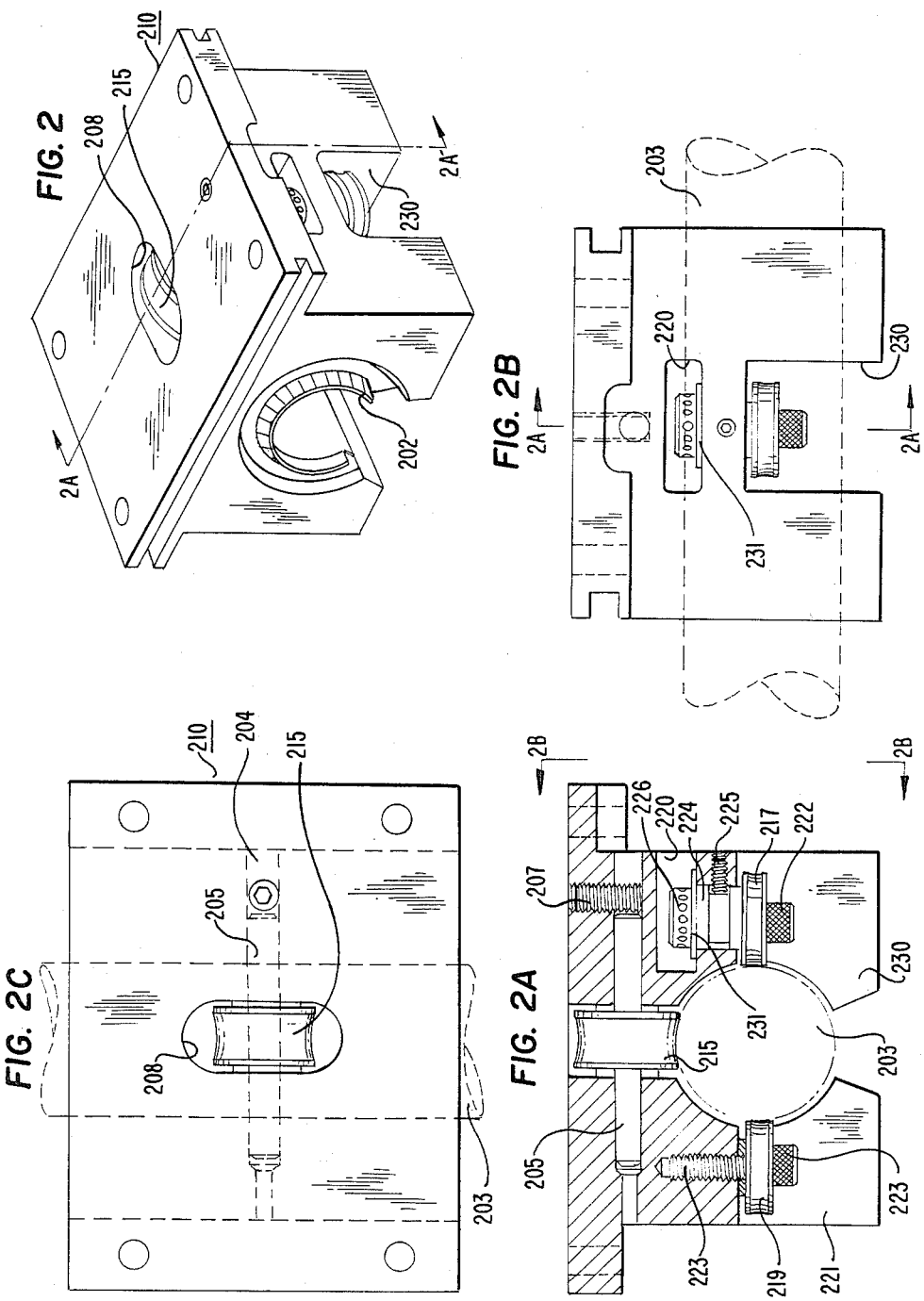

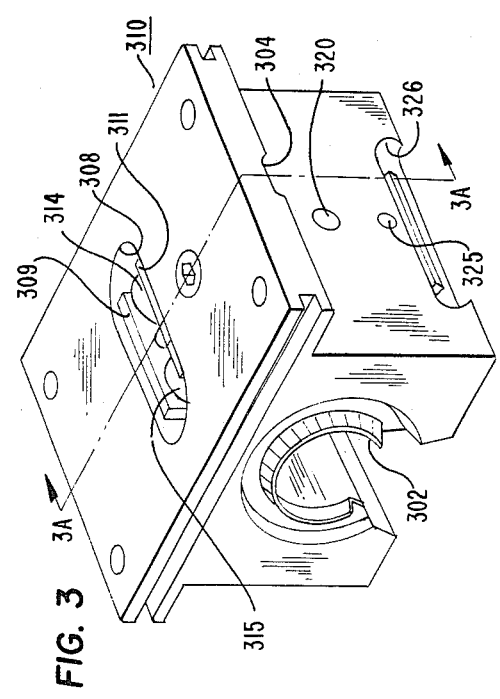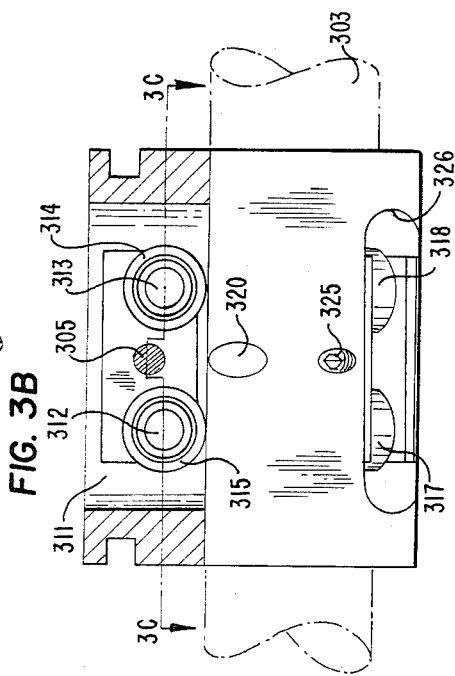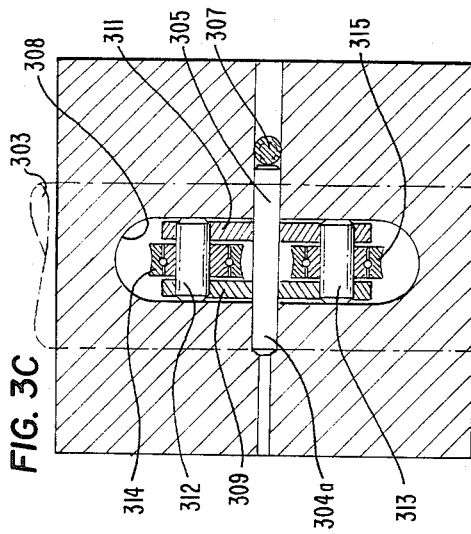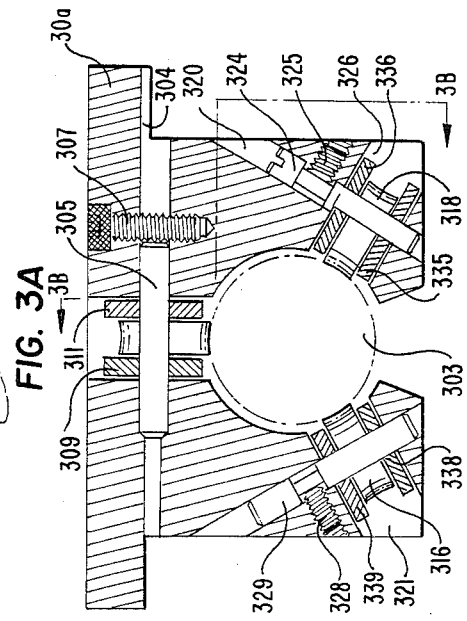

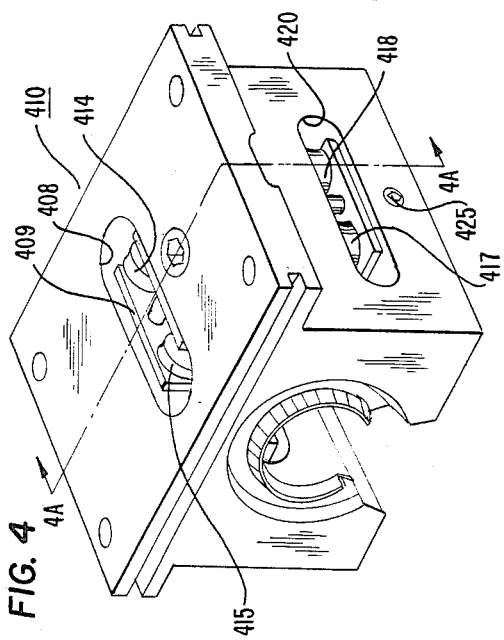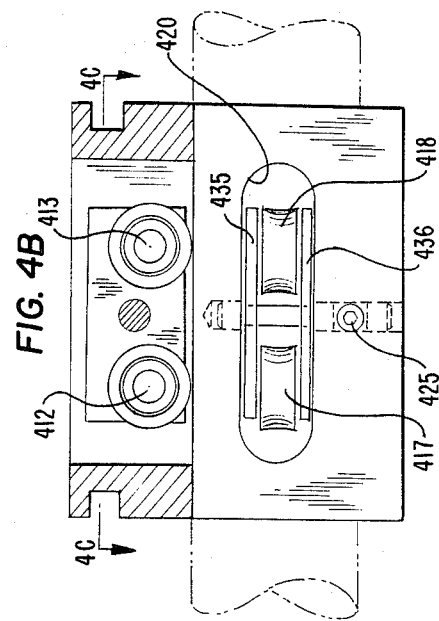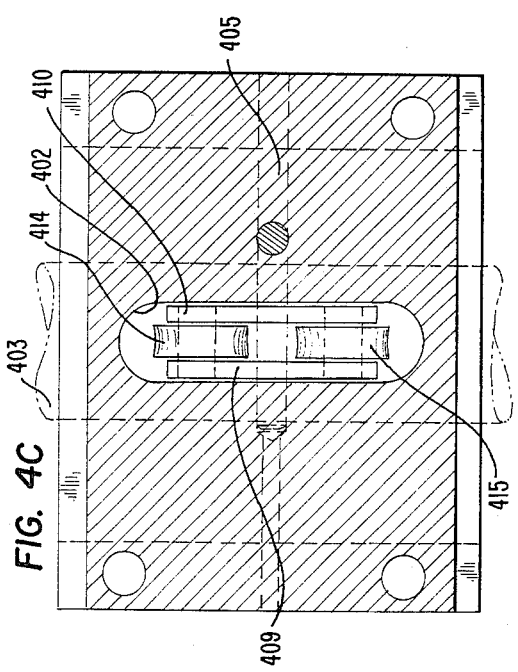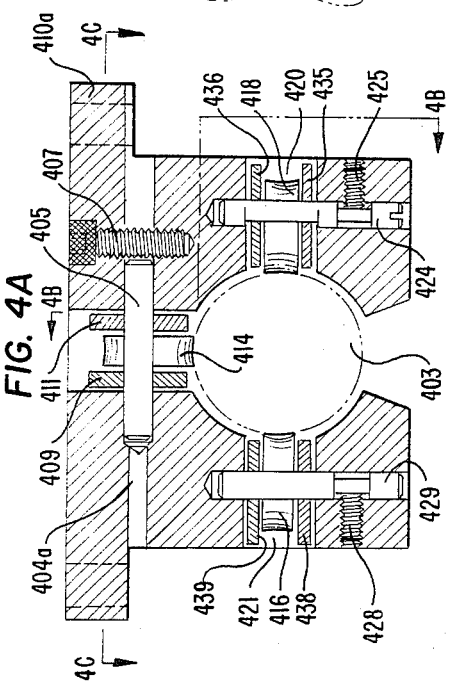

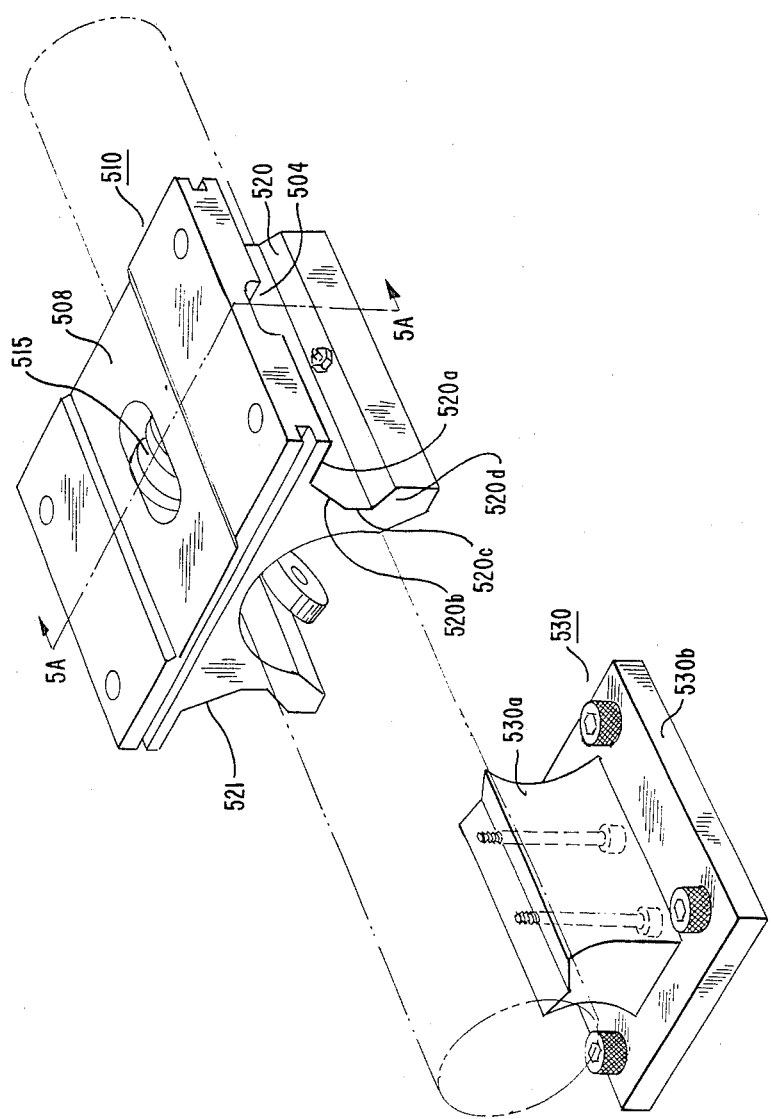

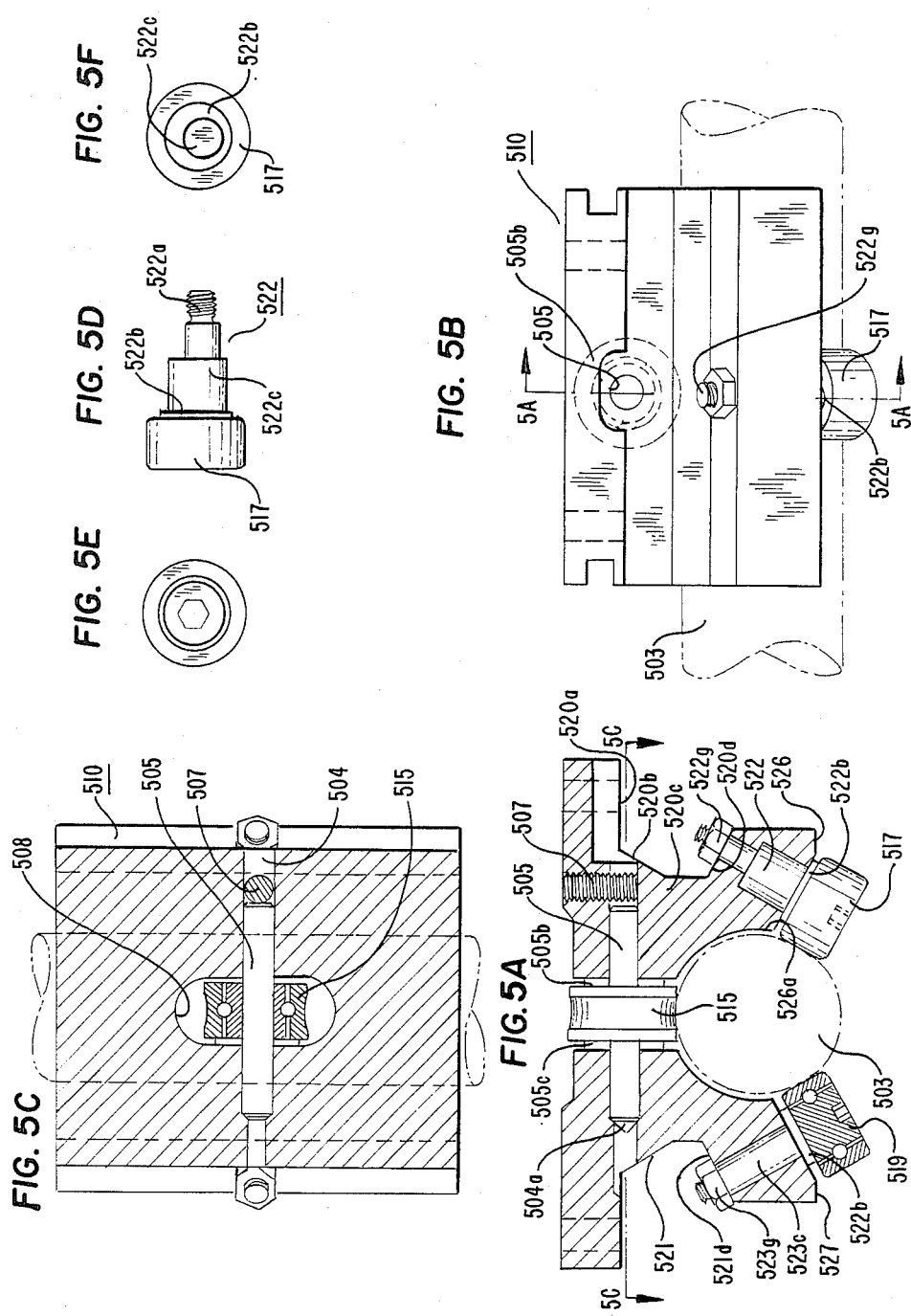

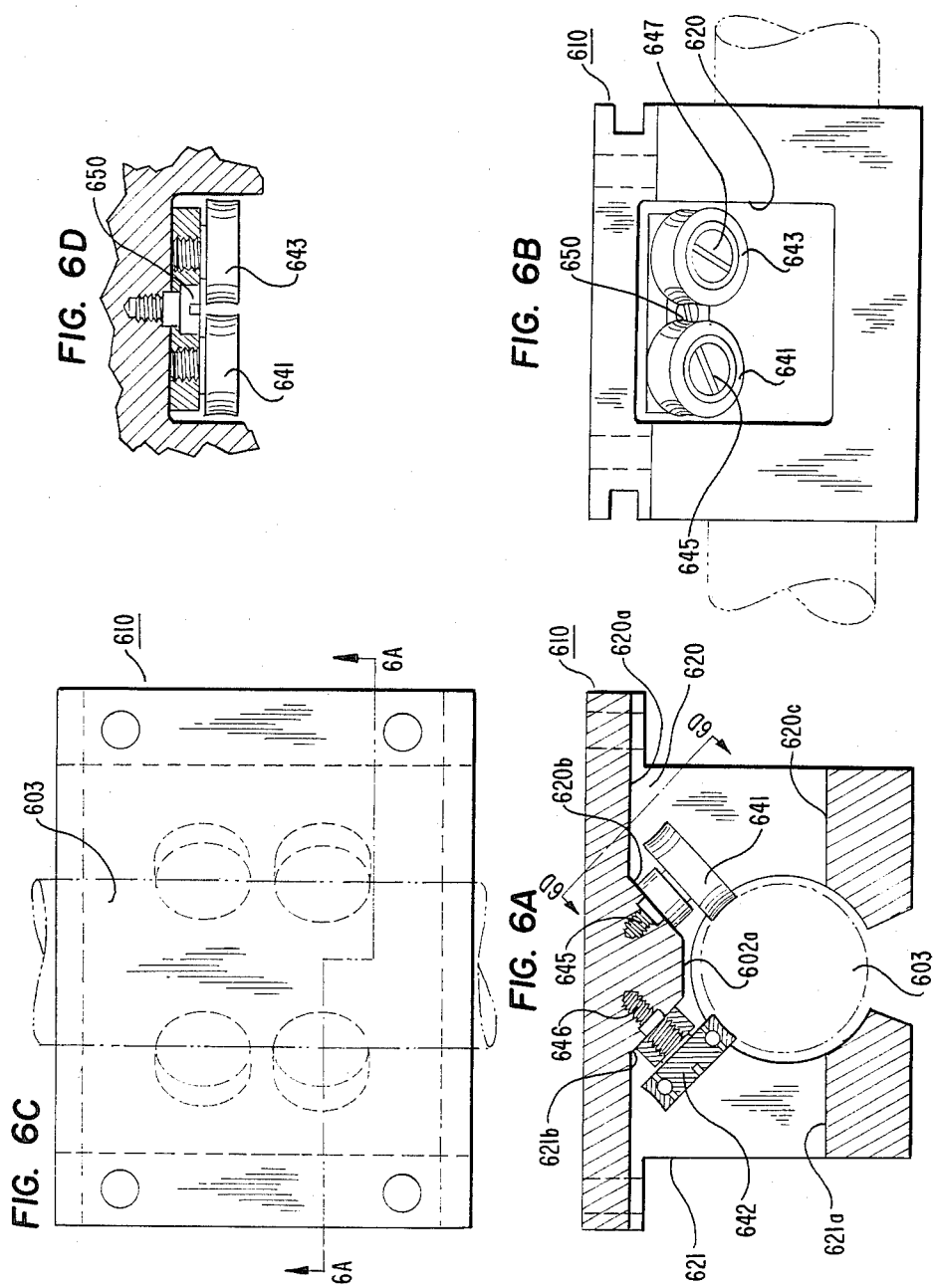

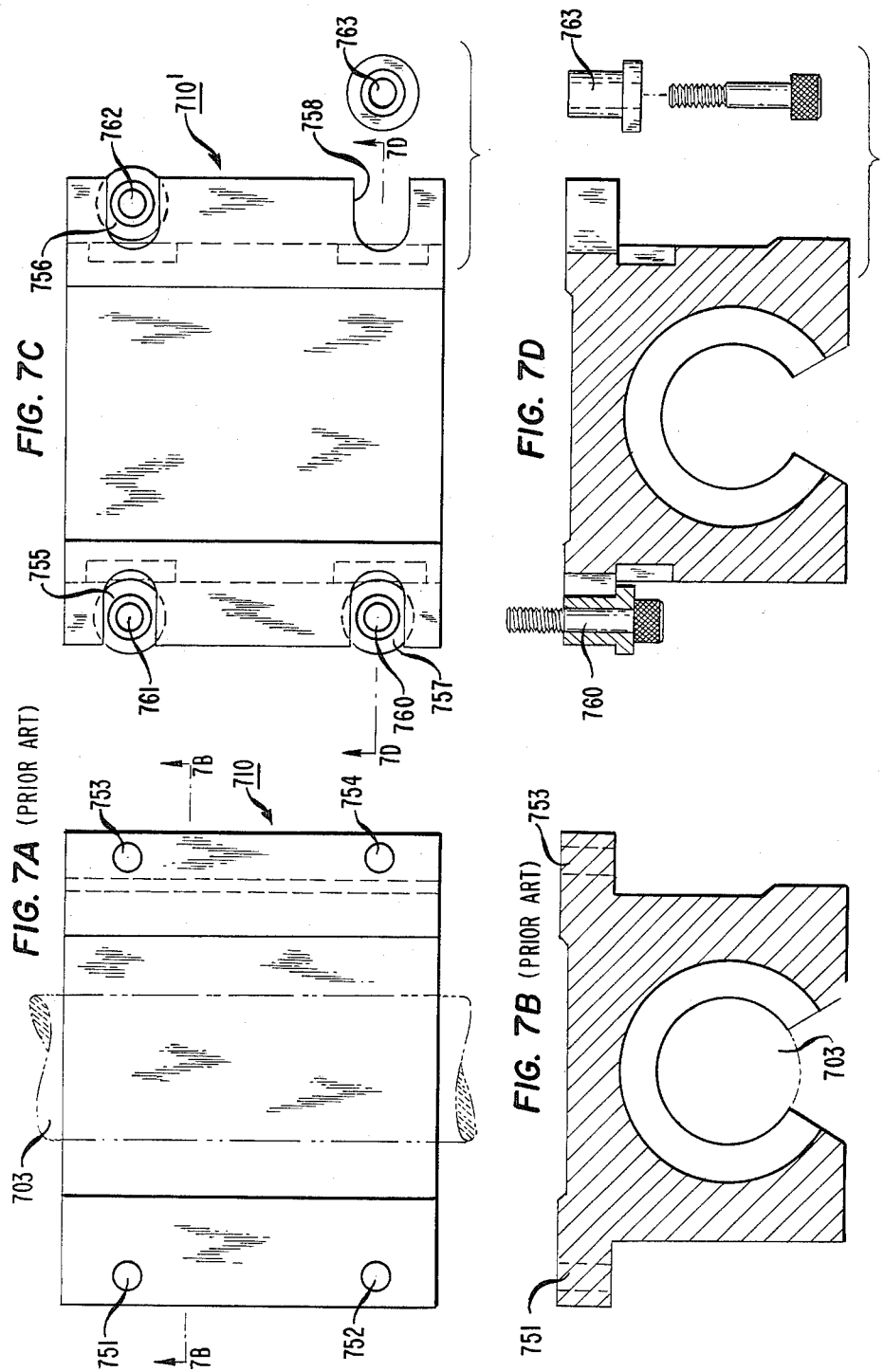

LINEAR MOTION PILLOW BLOCKS INCLUDING SELF-ALIGNING FEATURES

This relates to linear motion pillow blocks including self-aligning features, of a type which are applicable to floating pillow blocks which serve as bearings and guides in a slide assembly for a reciprocating carriage.

BACKGROUND OF THE INVENTION

Systems comprising shafts which are constructed for slideable linear motion in cylindrical bearings are subject to a high degree of friction, and wear, binding and chatter because of misalignment, which lead to lubrication and maintenance problems.

In the prior art, an attempt has been made to reduce or eliminate some of the problems in such systems by using one or more oblong re-circulating ball circuits or Roundway bearings which circulate in the longitudinal direction of the shaft.

Such prior art systems have certain disadvantages, in that they are heavy, requiring a substantial amount of additional material; and the circulating ball or roller trains retain dirt and foreign particles. Furthermore, they exert extreme pressures at the points of contact on the shaft which cause what is known as 'brinelling' in which the material of the shaft flakes away.

BRIEF DESCRIPTION OF THE INVENTION

It is therefore the principal object of the present invention to provide an improved linear motion pillow block system which is characterized by self-alignment in both the x and y directions. Another object of the invention is to provide a system comprising sealed bearings, adapted for life-time anti-friction lubrication, in which the bearing elements are less likely to be subject to rust or corrosion than prior art types. Other objects of the invention are to reduce the weight of material required for the bearings and bushings over that required for similarly functioning prior art systems, and to provide bearing structures which are readily adjustable to take up play.

These and other objects are realized in linear motion ball pillow blocks of the present invention which are constructed to include a plurality of sealed roller bearings disposed in tangential contact with the primary shaft which may be disposed at one position or at a plurality of positions spaced-apart around its periphery, each bearing being mounted to rotate about its own stud, whereby the roller bearing acts as a cam follower making rolling contact with the curved system on the outer ball bearing race and linear contact with the primary shaft.

It is contemplated that the improved adjustable or floating pillow blocks of the present invention can be used in a system comprising a pair of polished substantially parallel metal shafts on which are mounted a carriage comprising a flat metal plate which is supported near its four corners by four roughly cubical pillow blocks. Such a system is described in detail in my U.S. Pat. No. 4,264,112, issued Apr. 29, 1981, which is incorporated herein by reference.

Several different embodiments of the improved adjustable pillow blocks of the present invention are disclosed. In one embodiment, the sealed roller bearings are rotatably disposed on studs which are located at angles 120 degrees apart, around the periphery of the shaft and transverse to its principal axis. In another embodiment, in each of the positions, 120 degrees apart, a pair of sealed roller bearings is respectively journaled on a pair of studs aligned with the principal shaft. The studs are fixedly mounted between end plates which are disposed to pivot about a secondary shaft normal to the principal shaft. A particular feature of the invention is a device for making fine adjustments in the position of one of the sealed roller bearings in tangential relationship to the principal shaft by utilizing a screw to rotate the end plates about the secondary shaft or to rotate an eccentrically tapped stud supporting the bearing.

The systems of the present invention have the advantage of providing self-alignment of a linear motion pillow block in both an x and y direction, utilizing a relatively light-weight structure of sealed roller bearings which do not retain dirt and foreign particles and which are less likely to be subject to rust and corrosion than prior art types. Furthermore, extreme pressures are avoided at the points of contact between the bearings and the shaft, thereby minimizing brinelling. Another feature of the invention is the ease with which the tangential relationship between one of the sealed roller bearings and shaft can be adjusted by fine tuning.

It will be understood that while the improved pillow blocks of the present invention are highly suitable for use in a system such as disclosed in my prior U.S. Pat. No. 4,164,112 supra, they are not limited to use in such system, and may have other applications.

These and other objects, features, and advantages will be better understood by a study of the detailed specification hereinafter with reference to the attached drawings.

SHORT DESCRIPTION OF THE DRAWINGS

FIG. 1 is a perspective exploded view of a modification of the self-aligning pillow block of the present invention with the jibs being removed, which includes three single ball bearing rollers disposed to bear on the primary shaft at positions symmetrically spaced-apart at angles of 120 degrees around its periphery, the rollers being respectively mounted to rotate on secondary shafts disposed in normal relation to the primary shaft. One of the rollers is mounted on an eccentric stud for fine adjustments.

Figure 1:
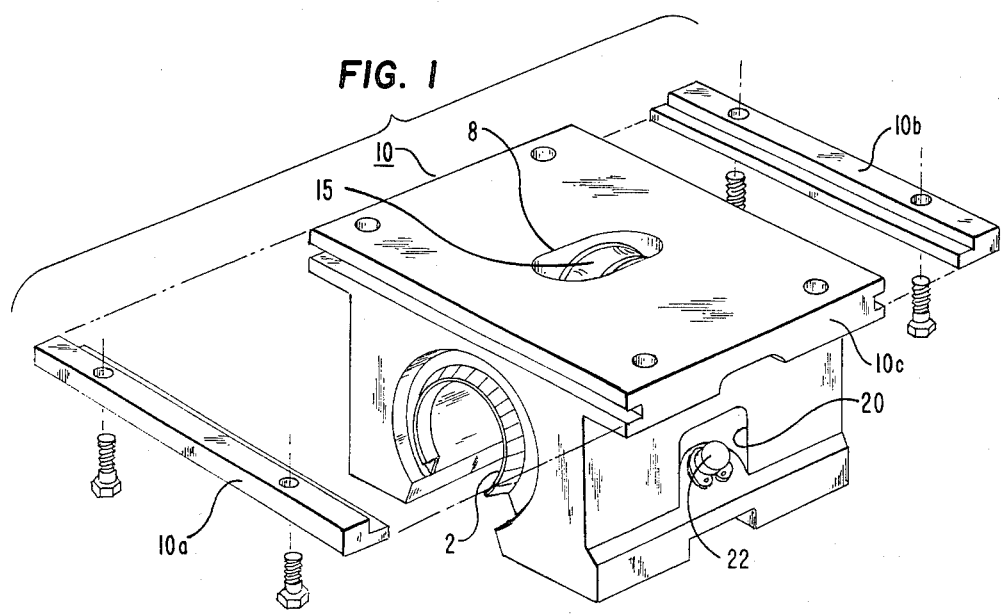
FIG. 1A is a perspective exploded view of FIG. 1, being removed from its position on the underside of the carriage plate.
FIG. 1B is a vertical cross-section taken through the plane 1B—1B of FIG. 1A.
FIG. 1C is a partial vertical longitudinal section through the planes indicated by the arrows 1C—1C of FIG. 1B.
FIG. 1D is a horizontal section through the plane indicated by the arrows 1D—1D of FIG. 1B.
FIG. 1E is an end elevation showing of the left-hand end of the eccentric stud of FIG. 1A.
FIG. 1F is a longitudinal section through the eccentric stud shown as an element of the combination in FIGS. 1A and 1B.

FIG. 2 shows, in perspective, a modification of the self-aligning floating pillow block of FIG. 1 including three single ball bearing rollers which are mounted to bear on the primary shaft, with the middle roller centered on the y axis through the cross-section of the primary shaft, and the other two rollers centered at diametrically-opposite positions along the x axis through the section, one of the latter rollers being mounted on an eccentric stud for fine adjustment.

FIG. 2A is a vertical section through the plane indicated by the arrows 2A—2A of FIG. 2.

FIG. 2B is a partial vertical section through the plane indicated by the arrows 2B—2B of FIG. 2A.

FIG. 2C is a top elevation of FIG. 2.

FIG. 3 shows, in perspective, one embodiment of the self-aligning floating pillow block of the present invention comprising a linear motion ball bearing bushing including three pairs of sealed ball bearing rollers symmetrically disposed at angles spaced-apart 120 degrees in the cross-sectional plane to bear on the primary shaft on which the pillow block is journaled. In this embodiment, the rollers are aligned in pairs, supported on axes normal to the axis of the primary shaft, the rollers of the pair being separated by and rotatable about a secondary shaft which passes through the pillow block normal to and above the primary shaft.

FIG. 3A is a vertical section along the plane indicated by the arrows 3A—3A of FIG. 3.

FIG. 3B is a partial vertical section along the plane indicated by the arrows 3B—3B of FIG. 3A.

FIG. 3C is a horizontal section along the plane indicated by the arrows 3C—3C of FIG. 3B.

FIG. 4 shows, in perspective, a modification of the self-aligning pillow block of FIG. 3 in which the pairs of ball bearing rollers are disposed to ride on the primary shaft, the central pair being aligned with the vertical y axis through the primary shaft and the other two pairs being aligned with the x axis at diametrically-opposite positions on the primary shaft.

FIG. 4A is a vertical section through the plane indicated by the arrows 4A—4A of FIG. 4.

FIG. 4B is a practical vertical section through the plane indicated by the arrows 4B—4B of FIG. 4A.

FIG. 4C is a horizontal plane indicated by the arrows 4C—4C of FIG. 4.

FIG. 5 is a perspective showing of another modification of a self-aligning pillow block in accordance with the present invention which includes three single sealed ball or roller bearing rollers mounted on three secondary screw-threaded shafts, the central one of which is interposed across the width of the pillow block normal to the primary shaft, the other two being disposed at symmetrically-spaced positions, spaced-apart 120 degrees, around the periphery of the principal shaft, being supported on shafts supported on flanges which project to the right and left of the base.

FIG. 5A is a vertical section taken along the plane shown by the arrows 5A—5A of FIG. 5B.

FIG. 5B is a side elevational showing of FIGS. 5 and 5A.

FIG. 5C is a horizontal section taken along the plane indicated by the arrows 5C—5C of FIG. 5A.

FIG. 5D is a side elevational showing of one of the stud mounted ball bearing rollers of FIGS. 5 and 5A-5C.

FIGS. 5E and 5F are end elevational showings of the two ends of the stud of FIG. 5D.

FIGS. 6A-6D show another modification of the self-aligning pillow block of the present invention which includes two pairs of sealed ball bearing rollers, which are mounted on screw-threaded studs, and which are disposed to bear on the upper surface of the primary shaft at angles of 45 degrees on opposite sides of the y axis through the center of the shaft section.

FIG. 6A is a vertical section taken through the planes indicated by the arrows 6A—6A of FIG. 6C.

FIG. 6B is a side elevation of the pillow block shown in FIGS. 6A and 6C showing the location of the ball bearing rollers on one side.

FIG. 6C is a top view of the pillow block of FIGS. 6A, and 6B.

FIG. 6D is a fragmentary view of one pair of rollers, taken along the plane indicated by the arrows 6D—6D of FIG. 6A.

FIGS. 7A and 7B show, in top view and cross-section, through the plane 7B—7B, respectively, a typical mounting arrangement for a standard, non-floating type of pillow block.

FIGS. 7C and 7D show in top view and cross-section, through the plane 7D—7D, respectively, the mounting arrangement for a floating pillow block, using mounting positions which have been cut out to make them V-shaped.

DETAILED DESCRIPTION OF THE INVENTION

The self-aligning pillow blocks described hereinafter are preferably designed for use in a system of the general types disclosed in my prior U.S. Pat. No. 4,264,112 which is incorporated herein by reference, or for that matter, in any type of system in which the pillow block is journaled in slideable relation to a shaft, except that the detailed structure of the pillow blocks will be as disclosed herein. Typically, such a system comprises four pillow blocks fastened to the underside of the four corners of a flat rectangular carriage plate, as shown and described in my U.S. Pat. No. 4,264,112 supra. For the purpose of illustrating the present invention, a number of pillow block embodiments will be described. It will be understood that identical pillow blocks can be attached to the underside of all four corners of a typical carriage plate, or they can be used singly, or in pairs, as required.

Referring to the drawings, the self-aligning pillow block 10 shown in FIGS. 1, 1A, 1B, and 1C, and 1D, 1E and 1F is preferably composed primarily of aluminum. A typical block 10, such as those described, may be, for example, say, 4¾ inches across, and 2⅛ inches high. Centered across the width of the pillow block 10 is a circular bore 2 running the length of the block from front to back, which in the present illustration has a diameter of 1⅝ inches. Interposed through the bore 2 is a cylindrical shaft 3 (See FIGS. 1B, 1C and 1D) which slideably engages the bore 2 in the pillow block 10.

So that the reader can better understand the structural environment of the self-aligning pillow block of the present invention. FIG. 1 is an exploded view in which the jibs 10a and 10b are shown in the process of being screwed into the elongated slots at the front and rear ends of the pillow block.

Figure 1A:
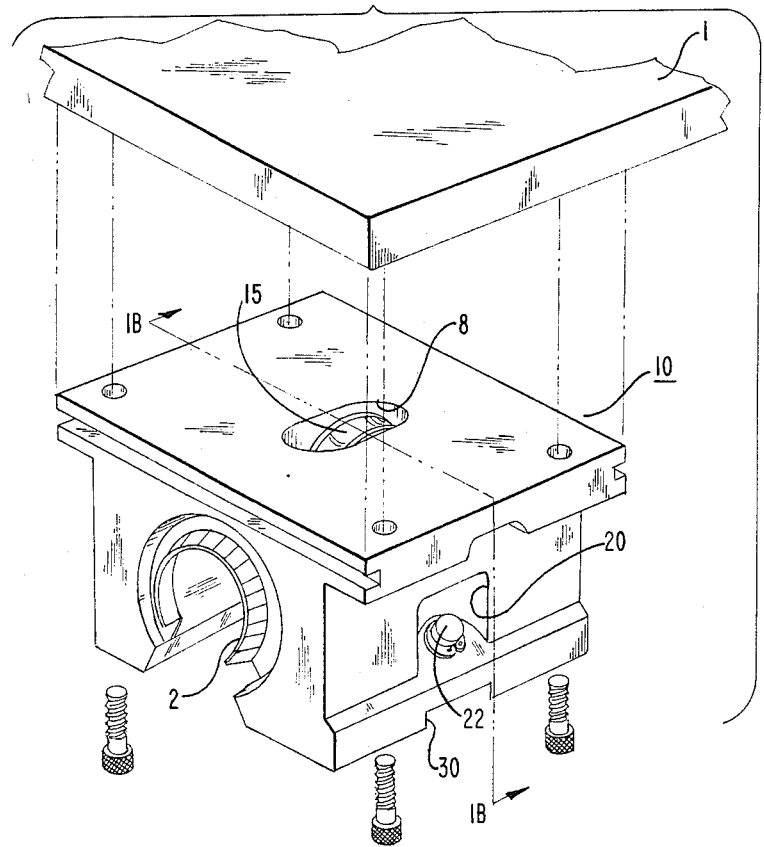

FIG. 1A shows the pillow block 10 which is typically designed for a 1½ inches primary shaft in the process of being attached to the underside of the corner of the carriage plate 1.

The block 10 includes a secondary bore 4 (FIGS. 1B and 1D) interposed through its thickness, midway between the front and the rear faces, normal to the axis of the shaft 3, and passing through a slot 8. The latter, which is located in the center of the upper face of pillow block 10, is 1½ inches long from front to back, and ⅝ inch wide, and providing an opening through the upper surface of block 10 which is centered on the shaft 3, as indicated in FIG. 1B. The secondary shaft 5, which is 2¼ inches long and ¼ inch in diameter, is retained at one end by a set screw 7 in a screw-threaded socket normal to secondary bore 4, the latter being in a position in the horizontal plane which is substantially normal to the axis of the primary shaft 3.

The ball bearing roller 15, is rotatably mounted on the secondary shaft 5, so that its peripheral surface, which is slightly concave, bears slideably and also in rolling contact on the primary shaft 3.

In addition to roller bearing 15 which rotates on shaft 5, this embodiment includes two other single ball or roller bearing rollers 17 and 19 disposed in spaced-apart relation around the periphery of primary shaft 3. These are respectively journaled to rotate on studs 22 and 23, which will be described presently.

In the present embodiment, these rollers are of a cam follower type designated "CYR series cam yoke CAMROL bearings", of the form described in detail on page 30 of Catalogue H-80A, published September 1985 by the McGill Manufacturing Company, Inc., Bearing Division, Valparaiso, Ind., 46383-4299. It will be understood that other similar type bearings of suitable form can also be used. In the presently described embodiment, the periphery of each of the rollers 15, 17 and 19 is formed to include a concavity in cross-section, as indicated in the drawing, which concavity substantially matches the curvature of the shaft 3, on which they are designed to ride in contacting relation, making substantially uniform contact. It will be understood that the concavity of the rollers is optional. For example, the concavity may be applied to the top roller only, and not to the laterally-disposed rollers. The rollers 17 and 19 are disposed symmetrically in a vertical plane centered between the front and rear faces of the pillow block. They are disposed around the periphery of the bore 2, centered so as to form angles of 120 degrees with the positions of ball bearing rollers 15. Roller 17 is disposed in a clockwise direction from roller 15; and roller 19 is disposed in a counterclockwise direction from roller 15. All of these rollers are substantially identical in form, and they are mounted so that they are each disposed in the same vertical planes, as shown in the vertical sectional view 1B.

The roller 17 is disposed in the slot 20, which is cut into the body of the pillow block 10, adjacent the base. Slot 20 is substantially centered from front to back, being aligned lengthwise with the slot 8.

Referring to FIG. 1B, the upper edge of slot 20 is located 1 inch below the upper surface of pillow block 10, forming an opening 20, elongated with rounded ends on the lateral walls which is 2 inches wide and 11/16 inch high. The upper inner surface of the slot 20, which is ½ inch deep, and the lower inner surface which is 15/16 inch deep are parallel, each forming an angle of, say, 30 degrees with the horizontal. They are connected internally by a straight rear wall. 13/16 inch below the lower surface of slot 20 is another slot 30, centered on and co-extensive with 20, the upper surface of which is cut back at an angle of 30 degrees with the horizontal, extending through and terminating at the main bore 2.

Centered on the bottom surface of slot 20 is a cylindrical bore 9/16 inch in diameter which passes through from slot 20 to slot 30, normal to their surfaces, and is just large enough to accommodate the stud 24. On the opposite side of 30, as shown in FIG. 1B, is a similar cutaway portion 21, which is oppositely directed.

The secondary shaft 22, supports the ball bearing roller 17 in contiguous slideable relation with the primary shaft 3. The shaft 22 takes the form of a bolt ⅜ inch long, and 5/16 inch in diameter, having a head at its lower end and screw-threaded at its upper end. The latter is seated in the eccentric cylindrical stud 24, which is shown in detail in side elevation in FIG. 1F, and in end elevation in FIG. 1E. This provides a simple device for fine tuning the contact between the ball bearing rollers and the primary shaft 3. In the present embodiment, the eccentric stud 24 is of general cylindrical form, ⅛ inch long and 9/16 inch in outer diameter. The upper end or head 24a is ¼ inch thick, and has a central screw hole 24b for accommodating a hexagonally shaped wrench. Behind the head 24a is an annular slot 24c which accommodates an annular collar 24e which acts as a bearing to hold stud 24 in place rotatably in the bore extending from slot 20 to slot 30. The body portion 24d of stud 20 is 9/16 inch in diameter and 5/16 inch deep. Between 24d and lower end 24g 11/16 inch along the axis, and of similar diameter to 24d, is a recessed portion 24f, which is ½ inch in diameter and extends 3/16 inch along the axis. The inner end 24g has a screw hole parallel to and spaced-apart, say, 1/32 inch, from the principal axis of stud 24, so as to be off center. The screw hole 24h is ½ inch long, and 5/16 inch in diameter. The secondary axis (bolt) 22 is interposed through the central axis of the ball bearing roller 17; and its screw-threaded end is fixed in the screw hole 24h. A screw-threaded bore 25 is interposed through the wall of the pillow block in a position between the lower surface of slot 20 and the upper surface of slot 30, so that its inner end coincides with the recess 24f of the stud 24. Thus, a screw interposed into screw hole 25 and engaging recess 24f functions to lock the eccentric stud 24, thereby preventing stud 24 from turning when screw 25 is tightened.

The roller 19 is mounted on the shaft 23, the screw-threaded upper end of which is accommodated in a screw hole which is drilled into and normal to the upper surface of slot 21. It will be understood that a shaft and eccentric stud, such as 22 and 24 could be substituted for the shaft 23, which, in the present embodiment is in a fixed position in the slot 21.

FIGS. 2, 2A, 2B and 2C show a modification of the pillow block described with reference to FIGS. 1 et seq. which includes three single ball bearing rollers spaced-apart around the periphery of the primary shaft, in which the only difference from the latter embodiment is the location of the ball bearing rollers to the right and left of the centrally disposed roller. To simplify the description, 200 has been added to each of the designations of FIGS. 1 et seq., similarly designated elements being substantially identical unless otherwise indicated. In the presently described embodiment, the right-hand ball bearing roller 217 is centered so that it forms a positive 90 degree angle with a plane through the center of roller 215; and roller 219 is centered so that it forms a 90 degree negative angle with a plane through the roller 215.

To facilitate this disposition of roller 217, the upper slot 220 is ¼ inch high, ½ inch wide, and 1 inch deep, its upper and lower surfaces being horizontal. The lower right-hand slot 230 is also rectangular, being 1⅜ inches high, and 2 inches wide, and passes entirely through the thickness to the central bore.

Referring to FIG. 2A, the shaft 222 is screwed vertically into the eccentric stud 224, which is retained by a snap ring 231, which rests on the horizontal lower surface of slot 220. The bolt 222 supports roller 217 in contacting relation with primary shaft 203.

The eccentric stud 224 is identical to the stud 24, described with reference to FIGS. 1 et seq. Stud 224 is locked by a tightened screw interposed into the screw-threaded opening 225, thereby controlling the position of ball bearing roller 217 as it bears on primary shaft 203. A series of small holes 226 disposed around the periphery of the head of stud 224 may be used for adjusting the position of 222 or 224. The latter can take the form of a hexagonal socket screw or a hexagon head cap screw, which is constructed to rotate stud 224 when bolt or secondary shaft 222 is tightened into an immobile position in stud 224 by use of an appropriate wrench.

The rectangular cut-out 221 on the left-hand side as shown in FIG. 2A, is 1⅜ inches high, and 2 inches wide, and passes through the thickness to the bore 202.

The ball bearing roller 219 is held in place by bolt 223 so that it bears against primary shaft 203.

FIGS. 3, 3A, 3B and 3C show a more complex modification of the embodiment shown in FIGS. 1 et seq., in which, instead of having three single ball bearing rollers disposed around the periphey of the primary shaft 3, replaces the single ball bearing rollers with three pairs of bearing rollers, each pair being mounted to move up and down rotatably about a secondary shaft disposed through the width of the pillow block, above and normal to the primary shaft. In FIG. 3, 300 has been added to the designating numbers; and it will be understood that elements having similar designating numbers to those of the earlier figures are similar, unless otherwise specified.

In the pillow block 310, the slot 308, which is centered on the upper surface, is similar to slot 8 of FIG. 1, except that its dimensions are different, being 2¾ inches long and ⅜ inch wide, and curved at the ends to accommodate the pair of ball bearing rollers 315 and 314, and the intervening secondary shaft 305. Disposed adjacent opposite sidewalls of the slot 308 are a pair of rectangular plates 309 and 311, each of which is 1⅛ inches long, ⅞ inch wide, and 3/16 inch thick, and which are disposed to be rotatable about the secondary shaft 305. The latter is interposed across the width of pillow block 310 in a direction normal to the primary shaft 303 in a secondary bore 304, which is ⅜ inch in diameter and is interposed a distance of 3¼ inches through the thickness of the pillow block 310. Secondary bore 304 is interposed in a direction normal to the axis of the primary bore 302, through the sidewalls of the slot 308, and is centered between front and back of pillow block 310, 5/16 inch below the flat top thereof. (See FIGS. 3B and 3C). The bore 304 passes through the width of pillow block 310, terminating at its inner end in a smaller bore which extends in about ⅜ inch from the other side. This provides a shoulder which holds 305 in place.

The secondary shaft 305, which is ⅜ inch in diameter and 1¾ inches long, engages the bore 304 and passes through the plates 311 and 309 of slot 308, shaft 305 being retained by 304a at its other end.

A pair of studs 312 and 313, ⅜ inch in diameter and ⅞ inch long, are disposed with their opposite ends positioned in place in the plates 309 and 311, so that their axes are parallel to and equally spaced-apart 1¼ inches on opposite sides of the secondary shaft 305, their centers being aligned ⅛ inch below the center of shaft 305. (See FIG. 3B).

It will be noted that the ends of the studs 312 and 313 are respectively fixed in the end plates 309 and 311 so that their axes are aligned below the center of the secondary shaft 305, and thus they are eccentrically mounted with reference to shaft 305.

Respectively journaled on each of the studs 312 and 313 are a pair of sealed, substantially cylindrical, ball bearing rollers 314 and 315 which are ⅞ inch in diameter, and 9/32 inch thick, and each having a central bore ⅜ inch in diameter. Rollers 314 and 315 are similar to the ball bearing rollers 15, 17 and 19, described with reference to FIGS. 1 et seq., and are curved concavely to match the curvature of the primary shaft 303 on which they bear in slideable relation. Just beyond outwardly-directed end of secondary shaft 305 is a screw hole 306 which is drilled vertically through the thickness of the top plate 310a of the pillow block 310 from its upper surface, and is designed to accommodate a screw 307 which is disposed normal to the axis of the secondary shaft 305, and retains the latter by trapping it.

The plates 309 and 311 are slightly rotatable about secondary shaft 305, thus adjusting the relative vertical positions of rollers 314 and 315, so that the latter, in addition to be rotatable about their own axes, are slightly movable up and down in their respective planes, thus providing further adjustments in their respective positions as they move along the primary shaft 303.

Two additional pairs of ball bearing rollers 317 and 318, and 316 and 319 (not shown) are disposed symmetrically in parallel vertical planes around the periphery of the bore 302, being centered so as to form angles of 120 degrees with a plane through the center of ball bearing rollers 311 and 315. Rollers 318 and 317 are disposed in a clockwise direction from rollers 314 and 315, and rollers 319 (not shown) and 316 are disposed in a counterclockwise direction from rollers 314 and 315. All of these rollers are substantially identical in form, and they are mounted so that the three front rollers and the three rear rollers are each disposed in the same vertical planes, as shown in the vertical sectional view 3A. The right-hand rollers 318 and 317 are disposed in the elongated slot 326, which is 2¾ inches long and 9/16 inch wide, and curved at the end, being cut into the body of the pillow block 310, adjacent the base. Slot 326 is substantially centered from front to back, being aligned lengthwise with the slot 308. Directly opposite slot 326, on the other side of pillow block 310 is a matching slot 321, also aligned lengthwise with slots 308 and 326, which accommodates the rollers 319 (not shown) and 316, in position to bear on the shaft 303. The rollers 317 and 318 are disposed with their ends retained or positioned in place between a pair of plates 335 and 336 which are similar to plates 309 and 311; and rollers 319 and 316 have studs through their bores and are positioned between a pair of plates 338 and 339, which are also similar to plates 309 and 311.

Interposed into the right-hand sidewall of the pillow block 310, so as to form an angle of 60 degrees with the horizontal is a bore 320, which accommodates the secondary shaft 324, on which the plates 335 and 336 are journaled. As in the case of the ball bearing rollers 309 and 311, the studs supporting the rollers 317 and 318 are eccentrically fixed between plates 335. and 336 with reference to the secondary axis 324. A screw-threaded opening adjacent a recess in the secondary shaft 325 accommodates a screw 328 which locks and retains 324 for fine tuning the position of ball bearing rollers 317 and 318 as they ride on shaft 303. When adjustment is desired, screw 325 is slightly loosened and a tool is interposed through opening 320 to slightly rotate 324 about its axis. Screw 325 is then re-tightened when the desired position is attained for adjusting the contact of roller 318.

The arrangement on the left-hand side of the pillow block 310 is similarly located for supporting ball bearing rollers 316 and 319 (not shown) as they bear against the main shaft 303. This includes the secondary shaft 329 which is interposed into a bore in the left-hand side of pillow block 310 at a 60 degree negative angle with the horizontal, on which are journaled the end plates 338 and 339 into which the ends of the studs for mounting the ball bearing rollers 319 (not shown) and 316 are centered on secondary shaft 329. A screw hole 328 accommodates a screw which locks shaft 329 in place.

FIGS. 4, et seq., shows a modification of the self-aligning pillow block disclosed in FIG. 3. In the embodiment of FIGS. 4, 4A, 4B, 4C and 4D, the designating numbers of the elements have been increased by 400 over corresponding elements shown in FIGS. 1, et seq., the parts indicated being substantially similar to those shown in the previous figures unless otherwise stated.

The principal difference between the device shown in FIGS. 3, et seq., and that shown in FIGS. 4, et seq., is that in the former, the three pairs of ball bearing rollers are disposed to ride on the cylindrical surface of the shaft 403 centered on positions which are symmetrically spaced-apart by angles of 120 degrees; whereas in the device shown in FIGS. 4 et seq., the pairs of ball bearing rollers are disposed to ride on the cylindrical surface of shaft 403 at positions centered 90 degrees apart. Thus, the ball bearing rollers 414 and 415 are mounted in the central slot 408, in the same manner as shown in FIG. 3; and the laterally-disposed pairs of rollers 417 and 418, and 419 and 416, are respectively mounted in slots 420 and 421 on diametrically-opposite sides of the shaft 403.

In the presently described embodiment, the slot 420, which is centered in the right-hand sidewall of pillow block 410, is ¾ inch wide, 2¾ inches long, and passes through to the bore 402. The front and rear walls of 402 are curved, and the upper and lower surfaces being substantially horizontal. The slot 421 on the left-hand side of the pillow block 410 is similarly positioned and dimensioned. The functions of the fine adjusting means, including the eccentrically positioned secondary shaft 424 are the same as in the embodiment described with reference to FIG. 3. It will be understood that the eccentric adjusting means of the present invention can be applied to the axes on which only one or all of the ball baring rollers are mounted.

It will be understood that in addition to having the rollers spaced-apart around the periphery of the primary shaft through angles of 120 degrees, as shown in FIGS. 1 and 3, or through angles of 90 degrees, as shown in FIGS. 2 and 4, it is contemplated that any different angular separations which are suitable for a particular purpose may be used.

FIGS. 5, 5A, 5B, 5C, 5D, 5E and 5F show a modification of the self-aligning pillow block 510 of the present invention which comprises three ball or roller bearings symmetrically disposed in fixed positions around the periphery of the primary shaft 503.

In the present embodiment, the slot 508, which is centered in the upper surface of pillow block 510, is of the general form of the slot of FIG. 1. A bore 504 is similar to the bore 4 of FIG. 1, except that it passes entirely through the width of the pillow block from left to right, as indicated in FIG. 5A, passing through the slot 508 at its central portion, and accommodating the shaft 505 which is screwed or trapped in fixed position at its opposite ends, extending in a direction normal to primary shaft 503. The ball bearing roller 515 is accommodated in the slot 508, being rotatably supported concentrically on the shaft 505.

Unlike the pillow blocks previously described herein the pillow block 510 is formed to include a pair of matching cut-out portions which run from the front to the rear on both the right-hand and left-hand sides of the pillow block. Referring to FIGS. 5 and 5A, measuring ½ inch vertically down from the top surface of 510, the inner upper surface 520a of 520 is cut back ⅞ inch in a horizontal plane to a corner junction with 520b, which forms an angle of 120 degrees with 520a. Surface 520b extends ⅛ inch in a vertical plane until it intersects with the vertical wall 520c, ⅛ inch high. The latter intersects with the outwardly-extending shelf 520d, which is 13/16 inch wide, and forms a 30 degree angle with the horizontal. In the embodiment disclosed the cut-out portion 521 is similarly dimensioned; but it may be differently dimensioned if the application requires it.

Interposed in a direction normal to the shelf 520d is a bore which passes through the thickness of the shelf 520d at an angular distance of ¾ inch, forming a 60 degree angle with the horizontal. The lower surface 526a is parallel to surface 520d.

In the embodiment shown in FIGS. 5 et seq., the shaft 503 is centered tangentially on a supporting pedestal 530 which is 1.829 inches high above the supporting surface and has a base 530b which is three inches in diameter and ⅜ inch above the supporting surface. The central support 530a extends 1.454 inches above the upper surface of base 530b. 530a is 11/16 inch in diameter to a depth of 1 inch below the top, the sides then flaring out in frusto-conical fashion at a cross-sectional angle of 15 degrees so that it is 1 inch in diameter where it meets the base. The upper surface of 530 is formed as an inverted cone about ⅛ inch deep, the sides forming angles of 20 degrees with the horizontal. The shaft 502 makes annular tangential contact with the inverted conical surface.

Although the supporting pedestal 530 has been illustrated only in combination with the pillow block shown in FIG. 5, it is contemplated that similar types of supporting pedestals can be used in combination with each of the other pillow blocks shown and described in the application.

Referring to FIGS. 5D, 5E and 5F, it is seen that the stud or shaft 522 has a body portion 522c which is ½ inch in diameter, and ⅝ inch long, and terminates at its upper end in a screw-threaded portion 522a which seats in nut 522g, and at its lower end serves as the axis of rotation for the ball bearing roller 511 which is supported to bear on the surface of the primary shaft 503. The stud or shaft 522 is inserted into place in the bore in the shelf 520d, as fixed in place by the nut 522a. An annular spacer or end plate 522b is interposed between the inner face of bearing 517 and the angular surface 526a. In a similar manner, the ball bearing roller 519 is mounted to engage primary shaft 503, being supported on shaft 523, which is interposed through a bore in shelf 521d of cut-out 521, and is held in place at its screw-threaded upper end by nut 523a. Bearing 517 is eccentric; bearing 519 is not eccentric, being a standard cam follower.

A further modified form of the invention is shown in FIGS. 6A, 6B, 6C and 6D.

Referring to FIGS. 6A, 6B and 6C, rectangular slots 620 and 621 are cut-out of the right-hand and left-hand sides of the pillow block 610. The slot 620 is 2⅝ inches wide, and 1⅞ inches high, and centered ⅝ inch from the front and ⅝ inch from the rear of the pillow block, being located ¾ inch above the base, and ½ inch below the top. Looking at FIG. 6A, it is seen that the upper inner surface of 620 extends inward in a horizontal plane to a depth of 1⅝ inches, at which it forms a 3rd quadrant, 45 degree angle with an inwardly and downwardly projecting member 620b which extends ⅝ inch to a surface 602a which is aligned with the zenith of the primary shaft 603 which is interposed from front to back in pillow block 610. The lower surface 620c of the slot 620 extends through the pillow block 610, opening into the bore 602 for the primary shaft 603. The left-hand slot 621 is similarly formed, providing a surface 621b forming a 45 degree, 4th quadrant angle. Together, the surfaces 620b and 621b form, in section, with surface 602a, a downwardly-projecting frustum of a triangle, the angular sides 620b and 621b providing mounting positions for two pairs of ball bearing rollers 641 and 643, and 642, 644 (not shown). The latter are each mounted rotatably on the respective studs 645, 647, and 646, 648 (not shown). The ends of studs 645 and 647 are screwed into the body of shelf 620b, through a rectangular pivot plate 649 which may be screwed into the shelf surface 620b by a screw 650 interposed between rollers 641 and 643 into the body of the shelf 620b. The rollers on the other side, namely 642 and 644 (not shown) may be similarly secured to the body of shelf 621b, or through an intervening buffer plate.

It is contemplated that in a typical assemblage comprising a mounting plate and four pillow blocks, two may be fixed and two may be self-adjusting or floating, in accordance with the teachings of the present invention.

Referring to FIGS. 7A and 7B, there is shown an arrangement in plan view, and in cross-section for mounting a standard non-floating type of pillow block, constructed to accommodate a one inch diameter shaft under a standard top plate, by interposing bolts or screws in each of the standard circular openings 751, 752, 753 and 754, located adjacent the corners, so that the pillow block is immovably fixed beneath the top plate.

A modification of this is shown in FIGS. 7C and 7D, which show an arrangement in plan view and in cross-section for mounting a floating pillow block 710 constructed to accommodate a one inch diameter shaft under a top plate. Instead of round holes, located adjacent the corners as indicated in FIGS. 7A and 7B, U-shaped cut-outs 755, 756, 757 and 758 which open out laterally are provided. Four bolts 760, 761, 762 and 763 are respectively mounted concentrically in annular bushings with the axes of the bolts vertical and their screw-threaded ends pointed up. This enables lateral movement of the pillow block ⅛ inch in each direction relative to the top.

It will be understood that the invention is not limited to the particular embodiments shown herein by way of example, but only by the scope of the claims hereinafter.

What is claimed is:

1. A pillow block having an outer surface and comprising in combination a primary bore having an elongated principal axis constructed to be slideably accommodated on a cylindrical primary shaft, and means for self-adjusting the position of said pillow block on said shaft, wherein said self-adjusting means comprises in combination:

at least one slot which passes through said pillow block between an outer surface thereof and said primary bore;
   an axle supported in said slot and extending in a plane normal to the principal axis of said primary bore;
   at least one roller, mounted in said slot in rotatable relation to said axle, said roller disposed to make tangential contact with said cylindrical primary shaft and constructed for at least slight rotation about said axle in response to slideable movement of said pillow block on said primary shaft;
   wherein said roller is a ball bearing roller annular in form and having a concave sectional shape which conforms to said cylindrical primary shaft.

2. The combination in accordance with claim 1 wherein said self-adjusting means comprising an axle comprises a secondary shaft interposed through said pillow block through a secondary slot and extending in a direction normal to the principal axis of said primary bore, said roller being rotatably mounted on said secondary shaft in said slot in contact with said primary shaft.

3. The combination in accordance with claim 2 comprising means for adjusting the tangential contact between said roller and said primary shaft which comprises means for mounting said roller in eccentric relation to said secondary shaft, and means for controlling the rotation of said secondary shaft about its long axis to adjust the contact between said roller and said primary shaft.

4. The combination in accordance with claim 2 wherein said self-adjusting means comprising an axle includes a plurality of secondary axles and corresponding rollers, each roller rotatably mounted on one of said secondary axles, said rollers being disposed in tangential relation to said primary shaft in spaced-apart positions around the periphery of said shaft.

5. The combination in accordance with claim 4 wherein said plurality comprises three secondary axles and corresponding rollers disposed in tangential relation to said primary shaft in respective positions substantially equally spaced-apart around the periphery of said primary shaft.

6. The combination in accordance with claim 4 wherein said plurality comprises three secondary axles and corresponding rollers disposed in tangential relation to said primary shaft, wherein one said roller is disposed centrally between the other two said rollers, which are disposed to contact said primary shaft in diametrically-opposite positions.

7. A pillow block having an outer surface and comprising in combination a primary bore having an elongated principal axis constructed to be slideably accommodated on a cylindrical primary shaft, and means for self-adjusting the position of said pillow block on said shaft, wherein said self-adjusting means comprises in combination:

at least one slot which passes through said pillow block between an outer surface thereof and said primary bore;
   an axle supported in said slot and extending in a plane normal to the principal axis of said primary bore;
   at least one roller, mounted in said slot in rotatable relation to said axle, said roller disposed to make tangential contact with said cylindrical primary shaft and constructed for at least slight rotation about said axle in response to slideable movement of said pillow block on said primary shaft;

wherein said roller is a ball bearing roller annular in form and having a concave sectional shape which conforms to said cylindrical primary; and wherein said means comprising an axle comprises a secondary shaft interposed through said pillow block through said slot and extending in a direction normal to the principal direction of said primary bore, a pair of plates disposed in spaced-apart relation along the length of said slot, and said secondary shaft interposed in a substantially normal direction through the thickness of said plates;

a pair of axle studs spaced-apart in said slot with their ends fixed in said plates on opposite sides and in parallel relation to said secondary shaft; and a pair of rollers respectively journaled rotatably in said slot on each of said axle studs, said rollers being supported in tangential contact with said primary shaft, whereby said plates are constructed to slightly rotate about said secondary shaft, thereby to change the relative vertical positions of said rollers to raise or lower the contact posiiton of one said roller in relation to the other said roller in tangential relation to said primary shaft.

8. The combination in accordance with claim 7 wherein said self-adjusting means comprises a plurality of secondary axles, corresponding pairs of plates, and pairs of aligned rollers, said pairs of aligned rollers being disposed in tangential relation to said primary shaft in spaced-apart positions around the periphery of said shaft.

9. The combination in accordance with claim 8 wherein said plurality comprises three secondary axles, pairs of plates, and corresponding pairs of rollers, disposed in tangential relation to said primary shaft, the pairs of rollers aligned in positions substantially equally spaced-apart around the periphery of said primary shaft.

10. The combination in accordance with claim 8 wherein said plurality comprises three secondary axles and corresponding pairs of plates and rollers disposed in tangential relation to said primary shaft, wherein one said aligned roller pair is disposed centrally between the other two aligned roller pairs, which aligned pairs are disposed to contact said primary shaft in diametrically-opposite positions.

11. A pillow block having an outer surface and comprising in combination a primary bore having an elongated principal axis constructed to be slideably accommodated on a cylindrical primary shaft, and means for self-adjusting the position of said pillow block on said shaft, wherein said self-adjusting means comprises in combination:
at least one slot which passes through said pillow block between an outer surface thereof and said primary bore;
an axle supported in said slot and extending in a plane normal to the principal axis of said primary bore;
at least one roller, mounted in said slot in rotatable relation to said axle, said roller disposed to make tangential contact with said cylindrical primary shaft and constructed for at least slight rotation about said axle in response to slideable movement of said pillow block on said primary shaft;
wherein said roller is a ball bearing roller annular in form and having a concave sectional shape which conforms to said cylindrical primary; and
wherein said self-adjusting means comprises a pair of lateral slots interposed inwardly from diametrically-opposite sides of said pillow block and terminating at said primary bore;
said slots forming on their inner ceiling a pair of inwardly-directed angular surfaces, a pair of screw-threaded studs interposed in normal relation to each said angular surface, in tangential relation to said primary shaft.

12. The combination in accordance with claim 11 wherein each of said angular surfaces supports a pair of studs and a corresponding pair of rollers in aligned relation.

13. In a system comprising a carriage supported to ride on one or more cylindrical primary shafts supported on a plurality of pillow blocks, wherein at least one of said pillow blocks comprises means for self-adjusting the position of said pillow block on said shaft, said self-adjusting means comprising in combination a primary bore constructed to be slideably accommodated on a corresponding one of said cylindrical primary shafts, wherein said self-adjusting means comprises in combination:
at least one slot which passes through said pillow block between an outer surface thereof and said primary bore;
an axle supported in said slot and extending in a plane normal to the principal axis of said primary bore;
at least one ball-bearing roller, annular in form and having a concave sectional shape, which conforms to said cylindrical primary shaft, mounted in said slot in rotatable relation to said axle, the concave section of said roller disposed to make conforming contact with the periphery of said primary shaft and constructed for at least slight rotation about said axle in response to slideable movement of said pillow block on said primary shaft.

14. A system comprising a carriage in accordance with claim 13 wherein said one or more cylindrical shafts comprises two parallel primary shafts, and in which said plurality of pillow blocks comprise four pillow blocks respectively mounted adjacent the four corners of said carriage, said pillow blocks comprising an adjustable and a standard pillow block mounted on each said primary shaft.

15. A pillow block having an outer surface comprising in combination a primary bore having an elongated principal axis, constructed to be slideably accommodated on a cylindrical primary shaft, and means for self-adjusting the position of said pillow block on said cylindrical shaft, wherein said self-adjusting means comprises in combination:
at least one slot which passes through said pillow block between an outer surface thereof and said primary bore;
an axle supported in said slot, and extending in a plane normal to the principal axis of said primary bore;
at least one roller, mounted in said slot in rotatable relation to said axle, said roller disposed to make tangential contact with said cylindrical primary shaft and constructed for at least slight rotation about said axis in response to slideable movement of said pillow block on said primary shaft;
wherein the body of the pillow block has a rectangular top plate;
means for fastening the body of said pillow block beneath said top plate comprising a plurality of screws or studs;

said top plate having a principal opening through its thickness to accommodate each of said screws or studs;

wherein the openings of said top plate positioned to accommodate said screws or studs are elongated in a horizontal plane a substantial dimension exceeding the cross-sectional dimension of said screws or studs to enable the lateral movement of said top plate for adjusting the position of said pillow block with reference to variations in the cross-section of said primary shaft.

* * * * *